United States Patent [19]

Ozawa et al.

[11] Patent Number: 4,886,352
[45] Date of Patent: Dec. 12, 1989

[54] DEVICE FOR CONVEYING PHOTOGRAPHIC PAPER FOR USE IN PHOTOGRAPH PRINTING APPARATUS

[75] Inventors: Yoshio Ozawa; Takao Shigaki, both of Kanagawa, Japan

[73] Assignee: Fuji Photo Film Co., Ltd., Kanagawa, Japan

[21] Appl. No.: 206,059

[22] Filed: Jun. 13, 1988

[30] Foreign Application Priority Data

Jun. 19, 1987 [JP] Japan ............... 62-152616

[51] Int. Cl.$^4$ .................. G03B 29/00; G03B 27/58
[52] U.S. Cl. ............................... 355/28; 355/74
[58] Field of Search ................. 355/27, 28, 29, 74

[56] References Cited

U.S. PATENT DOCUMENTS

| | | | |
|---|---|---|---|
| 2,896,505 | 7/1959 | Nations | 355/29 |
| 4,444,485 | 4/1984 | Kogane | 355/29 |
| 4,754,308 | 6/1988 | Ozawa | 355/74 |

FOREIGN PATENT DOCUMENTS 6213073 10/1982 Japan .

Primary Examiner—Donald A. Griffin
Attorney, Agent, or Firm—Sughrue, Mion, Zinn, Macpeak & Seas

[57] ABSTRACT

An elongated photographic paper wound in the form of a roll is drawn from the front end portion thereof, an image is exposed an it in a printing portion, and is cut by a cutter. After it has been cut, the front end portion of the photographic paper is returned to the printing portion, and parts of the photographic paper are covered by a pair of mask heads. These mask heads are disposed above the photographic paper when a margin-less image is printed and when image is printed. However, in the case of a margin-less print, a larger area of the image is covered than the area in the case of a margin-provided print.

20 Claims, 7 Drawing Sheets

4,886,352

DEVICE FOR CONVEYING PHOTOGRAPHIC PAPER FOR USE IN PHOTOGRAPH PRINTING APPARATUS

INDUSTRIAL FIELD OF THE INVENTION

This invention relates to a device for conveying photographic paper for printing images from negatives to photographic paper for use in a photograph printing apparatus.

PRIOR ART

Many photograph printing apparatuses are constructed in such a manner that photographic paper in the form of a roll is conveyed from the front end thereof to a printing portion, is then conveyed a further distance to be cut into frames with a cutter, and is finally brought to a development portion.

Since this printing portion and the portion where the photographic paper is cut with a cutter are positioned away from each other, the photographic paper which has been cut into frames can be successively conveyed to the development portion in the case where the frames are printed successively. However, in the case where the frames are not printed in succession, the front end portion of the photographic paper on which the image is formed immediately after it has been printed cannot be cut until the next printing work starts, or alternatively the front end portion of the photographic paper must be run out without processing for the purpose of cutting the photographic paper, which wastes the photographic paper.

Although an apparatus has been disclosed (See Japanese Utility Model Publication No. 13073/1987) in which this waste of photographic paper is prevented by returning the front end portion of the photographic paper, it can only be returned to a point at which it can again be conveyed without coming off the conveying roller. Thus with such an apparatus, waste of photographic paper cannot be completely eliminated.

It is therefore an object of the present invention to provide a device for conveying photographic paper for use in a photograph printing apparatus in which photographic paper can be immediately developed after it has been printed even if photographic paper is not printed in succession, and furthermore, one in which wasteful consumption of photographic paper can be eliminated.

The present invention for use in a photograph printing apparatus in which a printing portion and a cutting portion are disposed away from each other, comprising means for conveying photographic paper which is able to return the photographic paper from the cutting portion to the portion for printing the photographic paper. The device further comprises a pair of mask heads in the lengthwise direction disposed on both sides of an optical axis for printing the photographic paper, and which determine the region to be printed by way of moving forward or rearward in the direction of the photographic paper to be conveyed with respect to the optical axis, and which form a space from a frame loaded with the photographic paper through which the photographic paper is conveyed. Finally, control means are provided for controlling the means for conveying the photographic paper and the mask heads in the lengthwise direction in order to cause the front end portion of the photographic paper to be covered with a mask head in the lengthwise direction on the downstream side whenever photographic paper is printed.

According to the present invention, since the front end portion of the photographic paper is sandwiched by a mask in the downstream direction and a frame loaded with the photographic paper at the time of printing, the front end portion of the photographic paper is located extremely close to the range where it is printed whether or not a margin is provided around the image to be printed. As a result, wasteful consumption of photographic paper can be eliminated.

PREFERRED EMBODIMENT OF THE INVENTION

Figure 1:
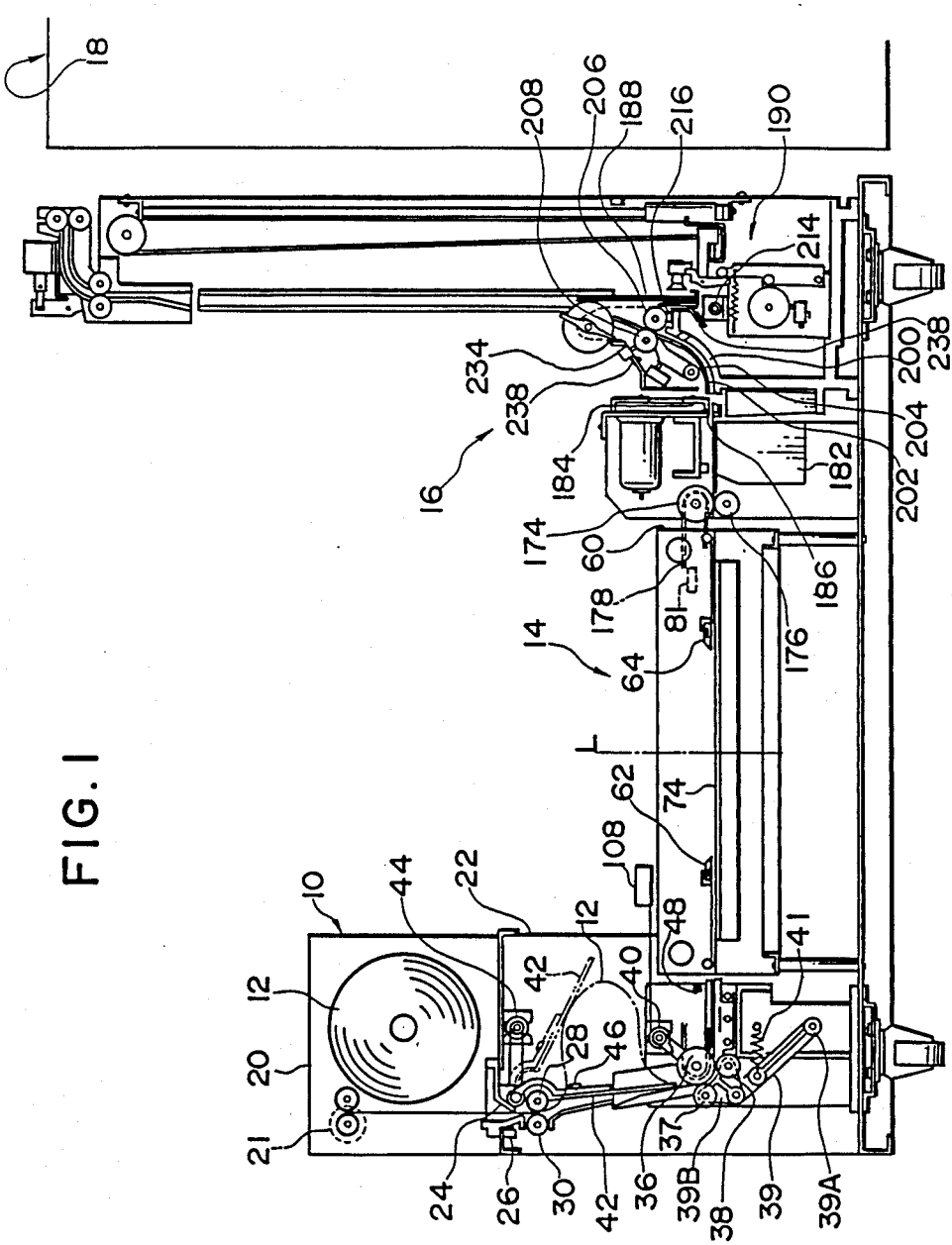
FIG. 1 is a schematic vertical cross-sectional view of a photograph processing apparatus to which the present invention is applied.

FIG. 1 illustrates a whole body of a photographic paper conveying system of a photograph printing apparatus to which the present invention is applied. A photographic paper 12 accommodated in a photographic paper accommodating portion 10 is conveyed to a photograph printing portion 14 at which an image thereof is exposed, is then conveyed, via a conveying portion 16, to a development portion 18.

Description of Photographic Paper Accommodating Portion

In the photographic paper accommodating portion 10, the photographic paper 12 which has not been exposed and wound in the form of a roll is accommodated in a box 20 which is mounted in a frame 22. By engaging and rotating a knob 21 attached to the box 20, the front end portion of the photographic paper 12 is passed through a drawing port 24.

The frame 22 is provided with a loading sensor 26 for detecting the front end portion of the photographic paper 12 which is being projected and light-shield holding rollers 28 and 30.

On the lower stream side of the holding rollers 28 and 30, holding and conveying rollers 36, 37, and 38 are provided for holding the front end portion of the photographic paper 12 which has been conveyed through the holding rollers 28 and 30 so that the photographic paper 12 is conveyed toward the photograph printing portion 14. The holding and conveying roller 36 is constructed so that it is rotated by the rotational force of a motor 40. This motor 40 is designed in such a manner that its rotation is controlled in accordance with a control routine to be described later by a control circuit 108, and is started by the activation of the loading sensor 26.

The holding and conveying rollers 37 and 38 are movably supported at one end of an arm 39 with a bracket 39B, the other end of the arm 39 being journalled, with a shaft 39A, to the frame 22. A tension spring 41 is arranged between the arm 39 and the frame 22. As a result, the holding and conveying rollers 37 and 38 are given an urging force so that they are abutted against the holding and conveying roller 36.

A guide plate 42, which can be rotated through a predetermined angular extent relative to the holding and conveying roller 28, is provided between the holding and conveying rollers 28 and 30 and the holding and conveying rollers 36 and 37. The guide plate 42 is, as shown in FIG. 1, arranged in such a manner that it can be rotated from a state in which it is located along the passage of the photographic paper 12 to a state in which it is, as designated by an imaginary line, withdrawn from the passage. This guide plate 42 is provided with a sensor 46 so that a condition is detected in which the intermediate portion of the photographic paper 12 forms a loop as designated by another imaginary line when the guide plate 42 is brought to a state designated by the imaginary line of FIG. 1.

An inlet portion of the photograph printing portion 14 is provided with a sensor 48 confronting the passage for the photographic paper 12 so that the front end portion of the photographic paper 12 is detected.

Description of the Photograph Printing Portion 14

Referring to FIGS. 2 to 5, the structure of the photograph printing portion 14 will now be described. In the photographic paper printing portion 14, the photographic paper 12 which is being introduced through a frame 60 is determined in its range to be printed by mask heads 62 and 64 in the lengthwise direction and mask heads 66 and 68 in the widthwise direction. In addition, printing light from a light source (omitted from the illustration) is arranged to be exposed to the range The frame 60 is formed in a frame shape whose top surface and bottom surface are opened. One end of it is provided with an opening 70 through which the photographic paper 12 is introduced, and the other end is provided with an opening 72 from which the photographic paper 12 is delivered. A loading frame 74 is disposed beneath the passage through which the photographic paper 12 is conveyed from the opening 70 through which it is introduced to the opening 72 from which it is delivered, the loading frame 74 forming a surface on which the photographic paper 12 is loaded.

Figure 3:
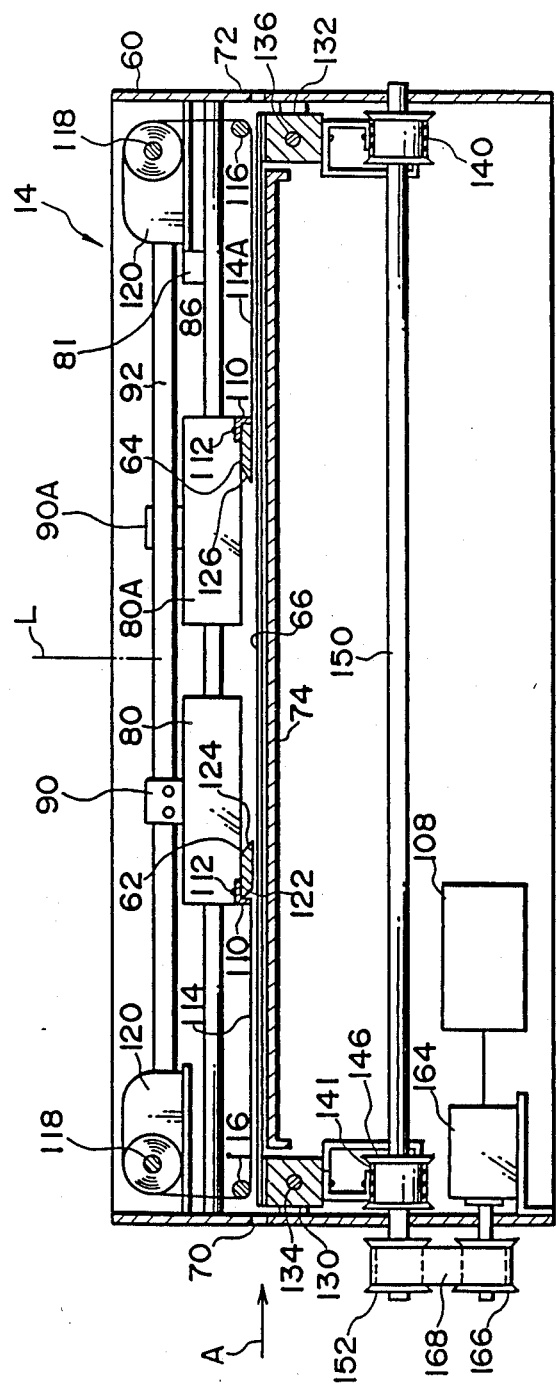
FIG. 3 is a cross-sectional view taken along the line III—III of FIG. 2.
Figure 5:
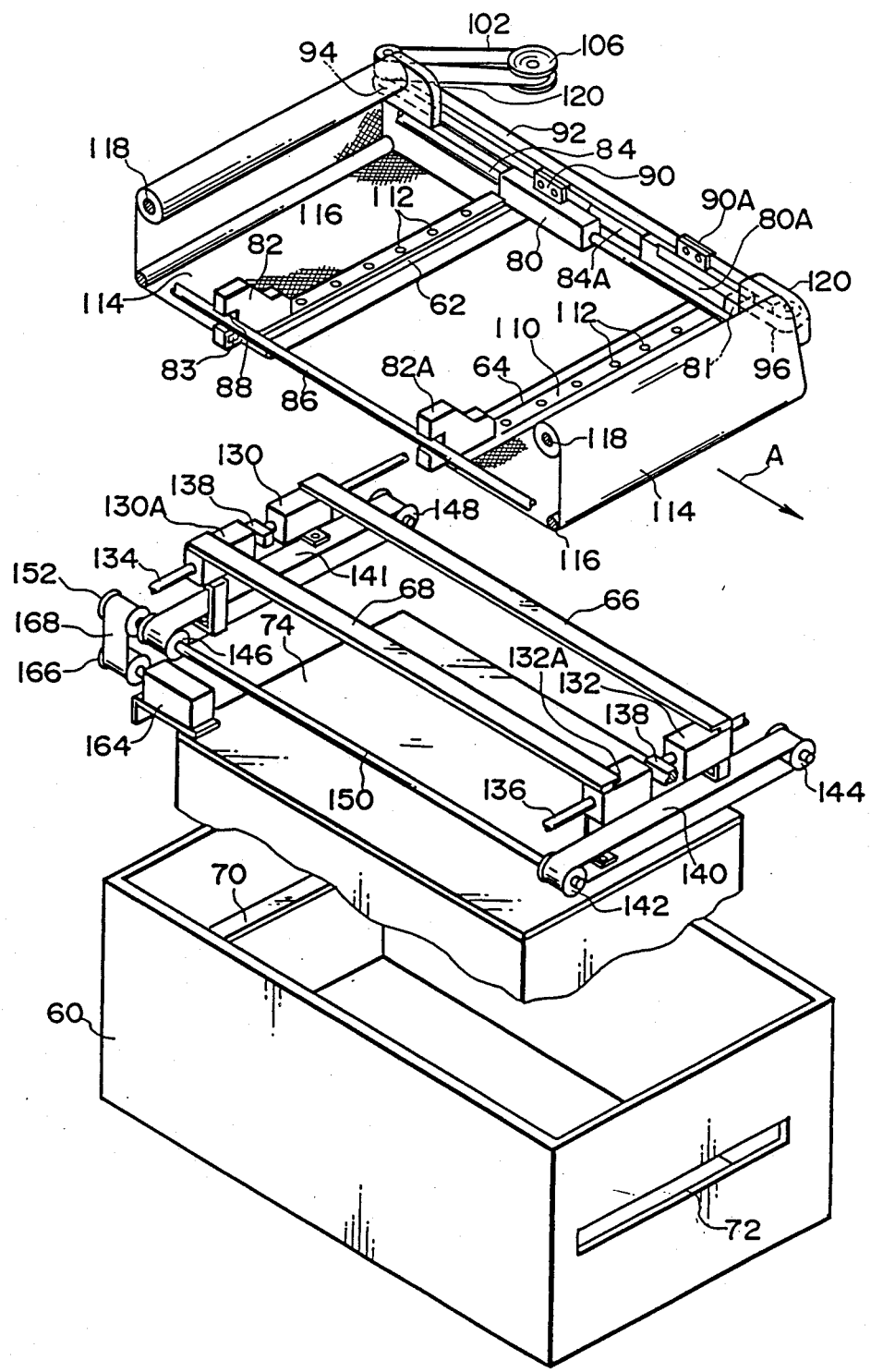
FIG. 5 is an exploded schematic view illustrating an essential portion of the photograph printing portion.

The mask heads 62 and 64 in the lengthwise direction are, as shown in FIGS. 3 and 5, respectively made of a thin plate, each formed in such a manner that the lengthwise direction of the mask heads 62 and 64 are arranged to be perpendicular to the direction in which the photographic paper 12 is conveyed (designated by an arrow A). The mask head 62 in the lengthwise direction is disposed on more upstream side of the passage through which the photographic paper 12 is conveyed than the mask head 64 in the lengthwise direction.

Movable blocks 80 and 82 are fixed to two lengthwise ends of the mask head 62 in the lengthwise direction. A guide rod 84 which is secured to the frame 60 penetrates the movable block 80, the guide rod 84 being arranged in parallel to the direction in which the photographic paper 12 is conveyed. The movable block 82 is, with a two-way part 88 thereof, mounted on a guide rod 86 which is arranged in parallel to the guide rod 84. As a result, the movable blocks 80 and 82 can be movable along the guide rods 84 and 86, and the mask head 62 can be moved straightly in the upstream and downstream directions of the passage through which the photographic paper 12 is conveyed. During this conveyance, the front end portion of the mask head 62 in the lengthwise direction maintains the perpendicular angular relationship with respect to the direction of the photographic paper 12 to be conveyed.

Meanwhile, both ends of the mask head 64 in the lengthwise direction are provided with movable blocks 80A and 82A, the movable blocks 80A and 82A being respectively arranged to a guide rod 84A and 86. The guide rod 84A is arranged to the frame 60 in parallel to the guide rod 84. As shown in FIG. 3, since the mask heads 62 and 64 in the lengthwise direction are respectively fixed to the lower end portion of the movable blocks 80 and 80A, and they are passed each other moving on the respective tracks, each front end portion of the mask heads 62 and 64 in the lengthwise direction can be moved in such a manner that they can be brought into contact with each other on an optical axis L.

Figure 2:
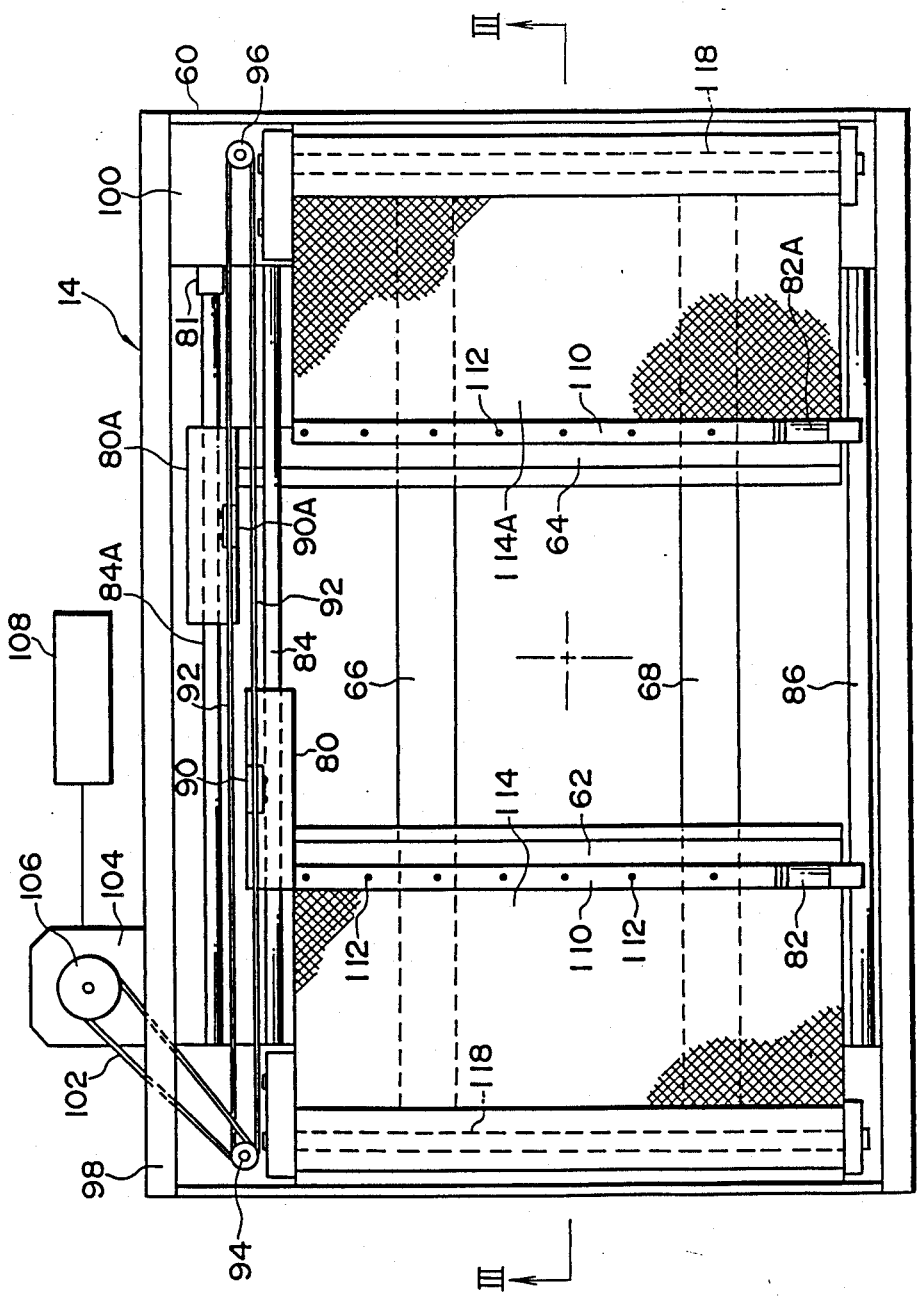
FIG. 2 is a plan view illustrating a mask head in the lengthwise direction of the photograph printing portion and its relative relationship.

As shown in FIGS. 2, 3, and 5, the intermediate portion of an endless belt 92 is, with brackets 90 and 90A, fixed to the movable blocks 80 and 80A. This endless belt 92 is a timing belt whose intermediate portion is wound to pulleys 94 and 96. These pulleys 94 and 96 are respectively journalled by brackets 98 and 100. The bracket 98 is fixed to the frame 60 on the upstream side of the passage through which the photographic paper 12 is conveyed, while the bracket 100 is fixed to the frame 60 on the downstream side of the same. As a result, the endless belt 92 is given a pair of parallel portions between the pulleys 94 and 96. The movable block 80 is fixed to one of the parallel straight portions, while the movable block 80A is fixed to the other one of the parallel straight portions. As a result, when the endless belt 92 is rotated, the movable blocks 80 and 80A are arranged in such a manner that they are moved in the opposite directions, that is, in the direction in which they come closer or are separated away from each other with respect to the optical axis L. A detection sensor 83 for detecting the fact that the movable blocks 80 and 80A come closer is provided for the movable block 82, while an original-point sensor 81 for detecting a fact that the movable blocks 80 and 80A have been separated by the maximum distance.

An intermediate portion of an endless belt 102 is wound to the pulley 94 in such a manner that the endless belt 102 is disposed adjacent to the portion to which the endless belt 92 is wound. This endless belt 102 is wound to an output shaft pulley 106 of a motor 104 so that the rotational force of the motor 104 is transmitted to the endless belt 92. The motor 104 is arranged to be controlled in its rotation by control means 108 which in main utilizes a microcomputer.

As shown in FIG. 3 and 5, a L-shaped metal part 110 is secured to each of the mask heads 62 and 64 by means of screws 112 in the lengthwise direction on the opposite side of the optical axis L. Each lengthwise end of mask bodies 114 and 114A is sandwiched and secured between the L-shaped metal part 110 and each of the mask heads 62 and 64 in the lengthwise direction, the mask bodies being made of a flexible material such as cloth. The intermediate portion of the mask body 114 is wound to windup rods 116 which are arranged between the two sides of the frame 60 on the upstream side and the downstream side of the passage through which the photographic paper 12 is conveyed, and whose lengthwise directions are arranged perpendicular to the direction of the photographic paper 12 to be conveyed. The mask body 114 is turned substantially perpendicularly so as to be drawn upwardly.

The front ends of the mask bodies 114 and 114A are wound, in the stacked form, by windup shafts 118 arranged between two ends of the frame 60 above and in parallel with the windup rods 116. These windup shafts 118 are always given an urging force in the direction in which the mask bodies 114 and 114A are wound up by winding urging means 120 such as a flat spiral spring. As a result, the mask bodies 114 and 114A are always given a predetermined tension.

The mask bodies 114 and 114A between the windup rods 116 and the mask heads 62 and 64 in the lengthwise direction are disposed in parallel with the loading surface for the photographic paper 12 of the loading frame 74. A certain gap is provided between the mask bodies 114 and 114A and the loading frame 74. As a result, when the mask heads 62 and 64 are aligned on the optical axis L, the mask heads 62 and 64 and the mask bodies 114 and 114A form a guide space on the loading frame 74 for the purpose of guiding the photographic paper 12. Therefore, when the photographic paper 12 is conveyed in the direction designated by the arrow A, the front end of the same can be suitably guided.

A cutoff 122 is formed between the mask head 62 in the lengthwise direction and the L-shaped metal part 110 so that the front end portion of the photographic paper 12 to be conveyed in the direction designated by the arrow A is prevented from being unintentionally brought into contact with the corner of the mask head 62 in the lengthwise direction. The upper surfaces of the mask heads 62 and 64 in the lengthwise direction confronting each other are provided with chamfers 124 and 126 so that recessed surfaces facing a light source (upper portion of FIG. 3) are formed.

Figure 4:
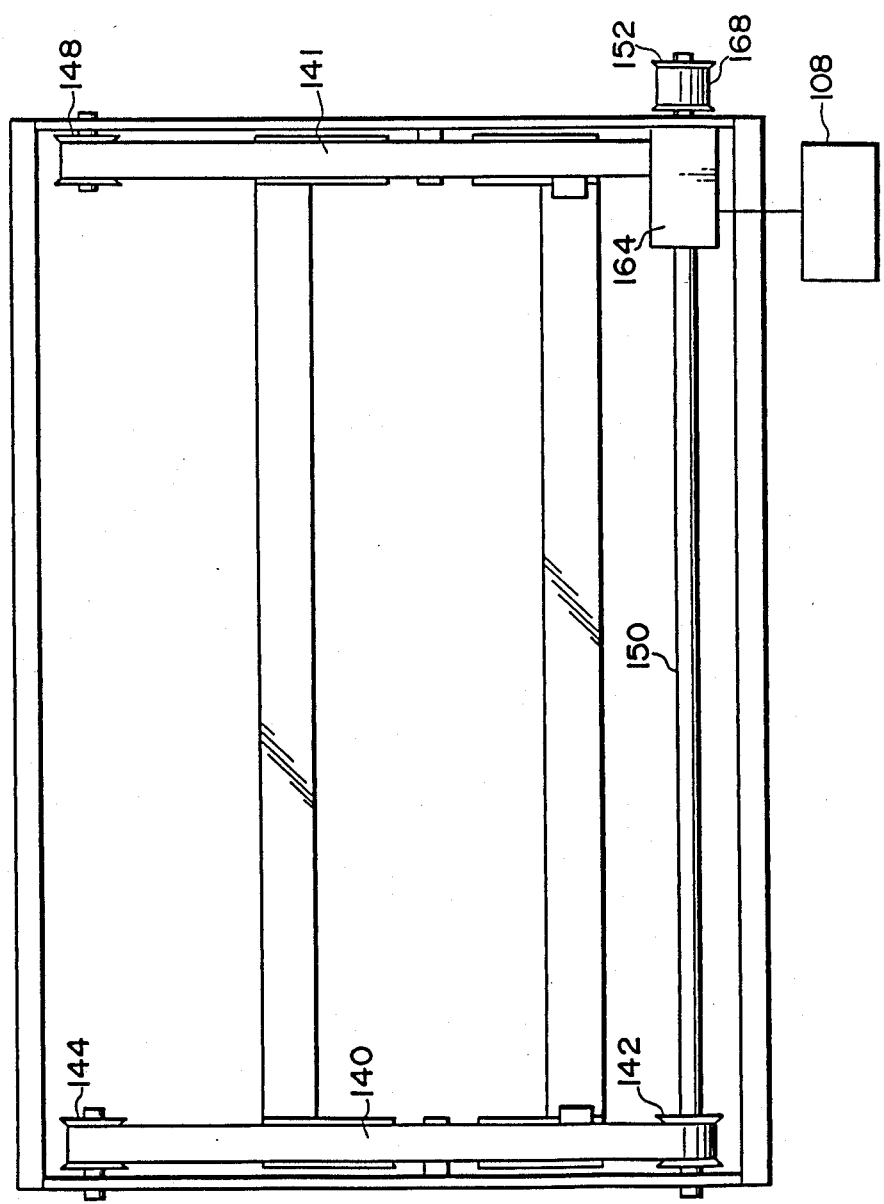
FIG. 4 is a rear view of FIG. 2 illustrating the mask head in the widthwise direction and its relative relationship.

As shown in FIGS. 4 and 5, the lengthwise ends of the mask head 66 in the widthwise direction are secured to the movable blocks 130 and 132. Guide rods 134 and 136 penetrate the movable blocks 130 and 132. In addition the guide rods 134 and 136 are disposed perpendicular to the photographic paper 12 to be conveyed, and arranged to two ends of the frame 60 on the upstream side and the downstream side of the photographic paper 12 to be conveyed. As a result, the mask head 68 in the widthwise direction can be moved in parallel in the direction perpendicular to the direction in which the photographic paper 12 is conveyed.

The mask head 68 in the widthwise direction is also fixed to the movable blocks 130A and 132A at the two ends thereof, and the guide rods 134 and 136 penetrate the movable blocks 130A and 132A so that the mask head 68 in the widthwise direction can be moved along the guide rods 134 and 136. As a result, the mask heads 66 and 68 can come closer and separate from each other with respect to the optical axis A. Each intermediate portion of the guide rods 134 and 136 is supported by the frame 60 with the arm 138 so that they are reinforced.

As shown in FIG. 4, the movable blocks 130 and 130A are fastened to the intermediate portion of the endless belt 141, while the movable blocks 132 and 132A are fastened to the intermediate portion of the endless belt 140. The intermediate portions of these endless belts 140 and 141 are respectively wound to pulleys 142, 144, 146, and 148, and each two intermediate portions is made in parallel. Therefore, the movable block 130 is fastened to one side of the parallel endless belt 141, while the movable block 130A is fastened to the other side of the same. The movable blocks 132 and 132A are also fastened to the parallel endless belt 140. These pulleys 142, 144, 146, and 148 are respectively journalled by the frame 60.

The pulley 142 and the pulley 146 are coaxially journalled, and the pulley 144 and the pulley 148 are also coaxially journalled. The pulley 142 and the pulley 146 are penetrated by a connecting shaft 150 so that they are fastened to each other. A pulley 152 is secured to one end of the connecting shaft 150. An endless belt 168 is arranged between an output shaft pulley 166 of a motor 164 and the pulley 152. The motor 164 is controlled in its rotation by control means 108.

As a result, when the endless belts 140 and 141 are rotated, the mask heads 66 and 68 are closer or are separated from each other with respect to the optical axis L in accordance with the direction of the rotation of the endless belts 140 and 141 so that the distance between the mask heads 66 and 68 is varied.

The mask heads 66 and 68 in the widthwise direction are, as shown in FIG. 5, each provided with a cut 172 between the movable blocks 130 and 132 and between movable blocks 130A and 132A, the cut being provided through the lengthwise distance of the mask heads 66 and 68. The top surfaces of the movable blocks 130, 132 and 130A and 132A are made the same level as that of the photographic paper loading surface of the loading frame 74. Therefore, when the front portion of the photographic paper 12 is conveyed in the direction designated by the arrow A, the two widthwise end portions of the same are inserted into these cuts 172. As a result, the unintentional rise of the two widthwise end portions of the photographic paper 12 is prevented.

As shown in FIG. 1, holding and conveying rollers 174 and 176 are disposed at the end of the lower stream in the frame 60. An endless belt 178 is arranged between the holding and conveying roller 174 and a holding and conveying roller 36 so that the conveying roller 174 is given a rotational force in synchronization with the holding and conveying roller 36.

Description of the Conveying Portion 16

The conveying portion 16 is provided with a printer 182 for printing characters on the rear side of the photographic paper 12 which has been printed out in the photograph printing portion 14, and which has been conveyed from the same, and a cutter 184 for cutting the photographic paper into frames. A sensor 186 is provided in the upstream direction of the cutter 184 in order to detect the front end portion of the photographic paper 12.

The photographic paper 12 which has been cut into frames is passed through a guide passage 204 formed by a lower guide plate 200 and a upper guide plate 202, is bent in the form of an arc, and is delivered upwardly.

A pair of horizontal holding and conveying rollers 206 and 208 are journalled in the vicinity of a discharge port of the guide passage 204 in such a manner that they sandwich the passage of the photographic paper 12 to be conveyed so that means for conveying the photographic paper 12 is constituted. The holding and conveying roller 206 is given a rotational force from a motor 214 by means of a timing belt 216 arranged between the holding and conveying roller 206 and an output shaft of the motor 214.

As a result, when the photographic paper 12 is conveyed through the guide passage 204 with its surface to be printed faced upwardly, the sensor 238 detects the conveyance and a solenoid 234 is actuated, and the holding and conveying roller 208 separates from the holding and conveying roller 206. As a result, the front portion of the photographic paper 12 is passed through between the holding and conveying rollers 206 and 208. After the front end portion of the photographic paper 12 has been passed, the electricity supply to the solenoid 234 is stopped, and the holding and conveying roller 206 and the holding and conveying roller 208 hold the photographic paper 12. Simultaneously, the motor 214 is actuated so that the photographic paper 12 is conveyed upwardly through the guide passage 204, and is accommodated in a stock portion 188. Feeding means 190 is disposed adjacent to the stock portion 188 for one by one feeding the photographic paper 12 which has been cut into frames to a development portion 18 after the processing speed of the printing portion 14 and the development portion 18 has been adjusted.

Operation of the Embodiment

When printing is started, the box 20 accommodating the photographic paper 12 wound in the form of a roll is mounted on the frame 22. The front end portion of the photographic paper 12 is introduced between the holding rollers 28 and 30 by manually rotating the knob 21 of the box 20.

When the front end portion of the photographic paper 12 is detected by the loading sensor 26, the motor 40 is actuated. By further conveying the photographic paper 12, it is conveyed in the direction designated by the arrow A with its front end held between the holding and conveying roller 36 and 37, 38. When the front end portion of the photographic paper 12 is detected by the sensor 86, and the same slightly projects over the cutter 184, the motor 40 is stopped. At this time, the cutter 184 is made to wait after it has cut off the front end portion of the photographic paper 12. As described above, when the front end portion of the photographic paper 12 passes through the printing portion 14, the masks 62 and 64 in the lengthwise direction are brought into close contact with each other for the purpose of smoothly conveying the photographic paper 12.

The mask heads 66 and 68 in the widthwise direction are preferably to be brought to a state in which the two widthwise ends of the photographic paper 12 can be introduced into the cut 172 by activating the motor 164 in accordance with the width of the photographic paper 12 which has been conveyed. As a result, the widthwise ends of the photographic paper 12 can be smoothly guided, and zigzag movement of the photographic paper 12 can be prevented.

When a print button (omitted from the illustration) is pressed, the front end portion of the photographic paper 12 is returned from the cutter 184. The thus-returned front end is located more down stream by substantially half the length to be printed than the optical axis L for printing. In this state, looseness occurs due to the return, the motor 44 makes the guide plate 42 turn up to the state designated by the imaginary line of FIG. 1 for the purpose of achieving a loop due to the looseness.

Figure 6:
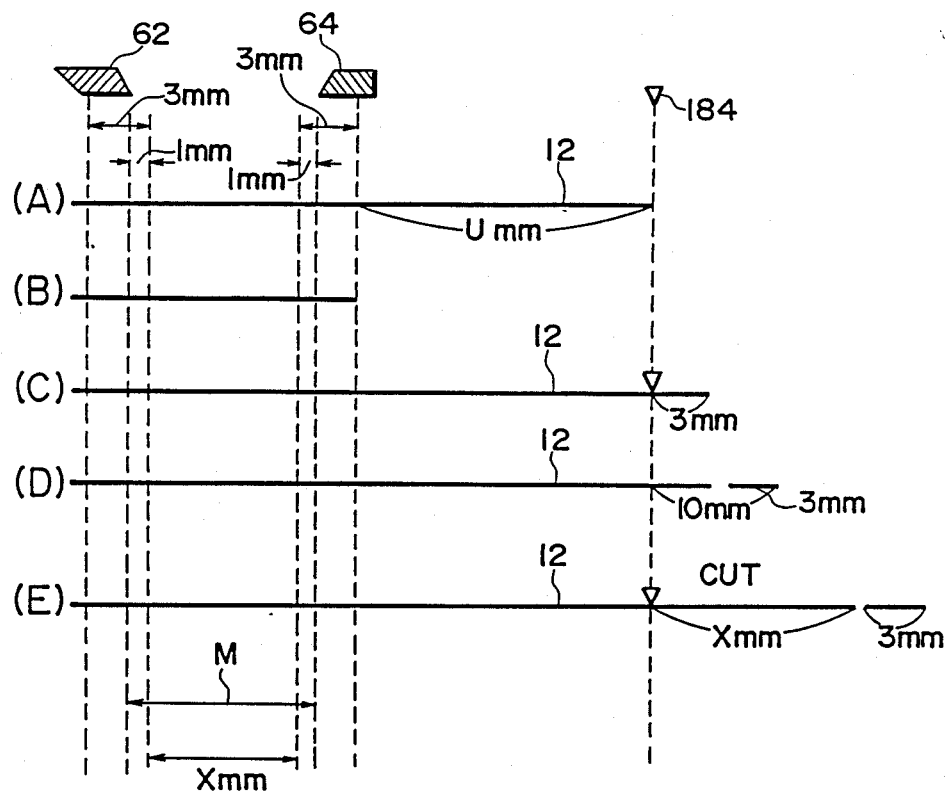
FIGS. 6(A) to 6(E) illustrate a state in which photographic paper with no margin is conveyed.

The conveyance of the photographic paper 12 will now be described in detail. In the case of a margin-less printing in which an image is formed over the entire surface of the photographic paper, the distance to be conveyed (distance to be returned) becomes U mm as shown in FIG. 6(B).

The mask heads 62 and 64 in the lengthwise direction move in such a manner that the interval between them becomes 2 mm longer with respect to the optical axis L than a distance of the photographic paper 12 to be conveyed (X mm) which is instructed by an operator. In this state, the front end portion of the photographic paper 12 is arranged to be covered by 2 mm by the mask head 64 in the lengthwise direction. The mask heads 66 and 68 in the widthwise direction move in such a manner that they separate from the widthwise ends of the photographic paper 12.

This state is a state in which printing is able to be started, wherein an image on a negative film is printed on the photographic paper 12 by printing light emerged from a light source (omitted from the illustration). Then, the motor 40 is rotated forward. The distance of the photographic paper 12 to be conveyed by the motor 40 becomes, as shown in FIG. 6(C), (U+3) mm. On the rear side of the photographic paper 12 which has been printed out, information needed is printed by the printer 182, and the unnecessary front end portion of the photographic paper 12 is cut off by the cutter 184. Then, the motor 40 is rotated forward. The length of the photographic paper 12 to be conveyed is, as shown in FIG. 6(D), set to 10 mm in this state in which other necessary information is printed on the rear side of the photographic paper 12 by the printer 182.

Then, the motor 40 is further rotated. In this state, the length of the photographic paper 12 to be conveyed is, as shown in FIG. 6(E), set to (X−10) mm. Prior to this, the front end portion of the photographic paper 12 is conveyed through the guide passage 204 with the surface on which an image is printed faced upwardly, and it is determined whether the sensor 238 detects the photographic paper 12. If the photographic paper 12 is detected, the solenoid 234 is activated, and the holding and conveying roller 208 separates from the holding and conveying roller 206 so that the front end portion of the photographic paper 12 is passed therebetween. After the front end portion of the photographic paper 12 has passed, the electricity supply to the solenoid 234 is canceled, and the holding and conveying roller 206 and the holding and conveying roller 208 hold the photographic paper 12.

When the photographic paper 12 is, in this state, cut by the cutter 184, the thus-cut photographic paper 12 is made a correct length to be printed, and is accommodated by the stock portion 188 after it has been moved upwardly through the guide passage 204 by the activation of the motor 214.

Figure 7:
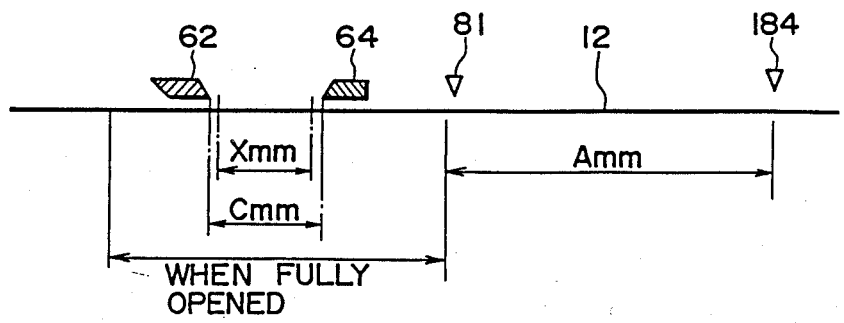
FIG. 7 illustrates the extent of the photographic paper is to be returned in the case of photographic paper without a margin.

The above-described length U of the photographic paper to be conveyed will now be described with reference to FIG. 7. Assuming that the distance between the original point sensor 81 of the mask in the lengthwise direction and the cutter 184 is A mm, and the length of the mask in the lengthwise direction when the masks 62 and 64 in the lengthwise direction are fully opened is B mm, the A mm and B mm being the constants which are determined in accordance with the structure of the device for conveying the photographic paper, the length U to be conveyed becomes $U = A + \{(B-X)/2\} - 3$ (mm). The length of the mask in the lengthwise direction to be conveyed becomes $C=X+2$ (mm).

As described above, in a case where margin-less image is printed on photographic paper, region M which is actually exposed to the photographic paper becomes larger by 1 mm at each lengthwise end of the photographic paper 12 than the size of the photographic paper 12 instructed by an operator. The surplus printed portion is cut off by the cutter so as to be the size instructed by the operator after the next printing has been completed.

In the case where a margin is provided in the periphery of the photographic paper, the margin being free from any printing, the motor 40 is rotated inversely in order to make the photographic paper 12 move backwardly to the exposure position. The length of the photographic paper 12 to be conveyed becomes, in this state, U mm of FIG. 8(B). The mask heads 62 and 64 in the lengthwise direction are moved with respect to the optical axis L through a distance which is 4 mm shorter than the distance (X mm) of the photographic paper 12 to be conveyed which is instructed by the operator for the purpose of forming a margin. The mask heads 66 and 68 in the widthwise direction are moved in such a manner that the margin is formed at the portion inner than the widthwise ends of the photographic paper 12.

Figure 8:
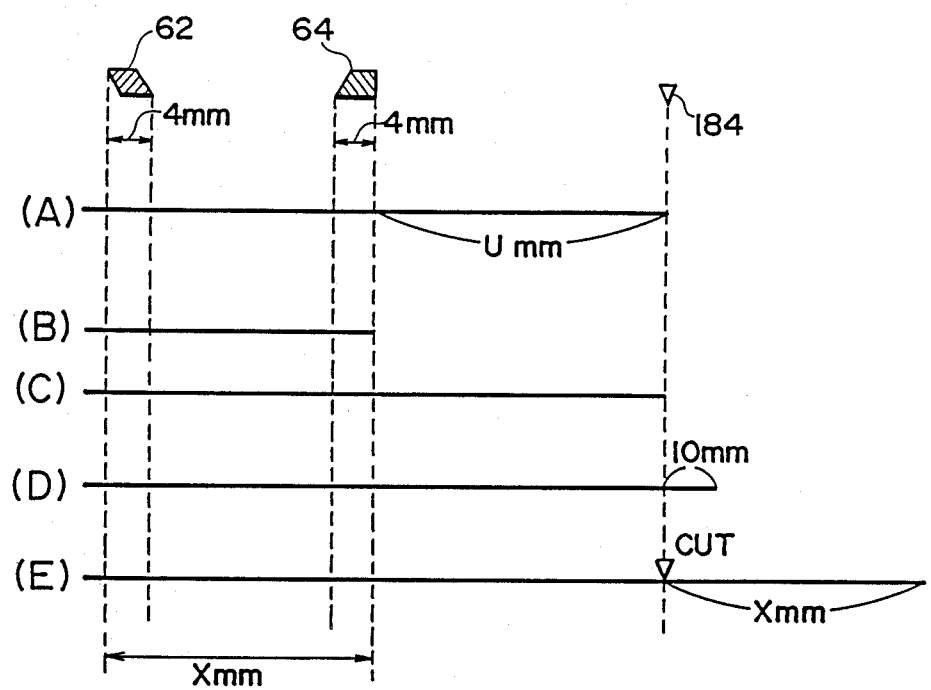
FIGS. 8(A) to 8(E) illustrate a state in which photographic paper with a margin is conveyed.

This is a state in which printing is able to be started, wherein an image on a negative film is printed on the photographic paper 12 by printing light emerged from a light source (omitted from the illustration). The motor 40 is rotated forward after the photographic paper is exposed. The distance of the photographic paper 12 to be conveyed becomes, as shown in FIG. 8(C), U mm. On the rear side of the photographic paper 12, information needed is printed by the printer 182, and the motor 40 is rotated forward. The distance of the photographic paper to be conveyed becomes, as shown in FIG. 8(D), 10 mm. In this state, other information needed is printed by the printer 182, and the motor 40 is further rotated. In this state, the distance of the photographic paper 12 to be conveyed becomes, as shown in FIG. 8(E), $(X-10)$ mm. Then, the photographic paper 12 is cut by the cutter 184. The thus-cut photographic paper 12 is conveyed upwardly through the guide passage 204 and is accommodated in the stock portion 188.

Figure 9:
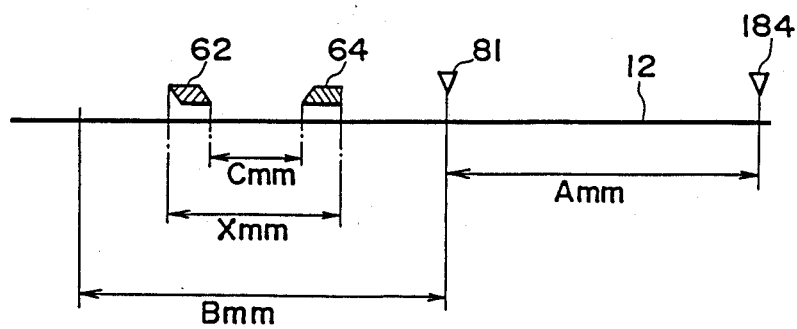
FIG. 9 illustrates the extent to which the photographic paper is to be returned in the case of photographic paper with a margin.

The above-described distance U of the photographic paper 12 to be conveyed will now be described with reference to FIG. 9. Assuming that the distance between the original point sensor 81 of the mask in the lengthwise direction and the cutter 184 is A mm, and the length of the mask in the lengthwise direction when the masks in the lengthwise direction are fully opened is B mm, the A mm and B mm being the constants which are determined in accordance with the structure of the device for conveying the photographic paper, the length U to be conveyed becomes $U=A+(B-X/2)$ (mm). The length of the mask in the lengthwise direction to be conveyed becomes $C=X-8$ (mm).

As described above, in the case where an image having a margin is printed on a photographic paper, a margin of 4 mm is formed in the periphery of the region M which is actually exposed, and which is determined in accordance with the degree of the separation of the masks in the lengthwise direction, and the photographic paper is cut to a size instructed by the operator.

As described above, the front end of the photographic paper 12 is made to wait at the position of the cutter 184 when a printing work is completed until the next printing is conducted, and is moved backwardly to the position at which the printing is conducted when the next printing is again conducted. However, the photographic paper which has been printed is made a product after it passes through the conveying portion 16 and the development portion 18. As a result, any loss time due to waiting does not occur.

Although, in the embodiment described above, the description has been made on an apparatus in which printing is conducted by a light source disposed above the loading frame 74, the structure may be vertically reversed in such a manner that the loading frame is disposed above the passage through which the photographic paper is conveyed so that the printing is conducted from lower portion to the upper portion.

Although, in the embodiment described above, the description has been made on a structure in which the mask heads 62 and 64 in the lengthwise direction are arranged to be moved by the same distance in the opposite direction from each other, a structure may be employed in which they are moved by different distances. Furthermore, in the above-described embodiment, parts of the mask bodies 114 and 114A are made the same height as the mask bodies 62 and 64 in the lengthwise direction in order to prevent an unintentional rise in the photographic paper 12. If there is a great interval between the mask bodies 114 and 114A and the loading frame 74, any such problems do not arise since the front end portion of the photographic paper 12 can be properly guided according to the present invention.

What is claimed is:

1. A device for conveying a photographic paper to allow images to be successively exposed on a continuous photographic paper, cutting the same into frames, and conveying them to an ensuing process performed by, for example, a development device, comprising:

(a) a portion for accommodating said continuous photographic paper;

(b) a printing portion disposed on the downstream side of said accommodating portion and which exposes an image on said photographic paper which has been drawn from said accommodating portion;

(c) a pair of mask heads disposed in said printing portion for determining a region on which said image is exposed by coming closer to and moving away from each other with respect to an optical axis for printing;

(d) a cutter disposed on the downstream side of said printing portion for cutting said photographic paper into frames;

(e) conveying means for conveying said photographic paper from said accommodating portion to said printing portion and said cutter on the downstream side, and which can reversely convey said photographic paper in the upstream direction; and (f) control means for controlling the relative positional relationship between said photographic paper and said mask heads in such a manner that when the portion to be printed at the front end of said photographic paper is located in said printing portion, said front end of said photographic paper is covered by either of said mask heads both in the case where a print provided with a margin is obtained and in the case where a margin-less print is obtained, and that the distance at the front end portion of said photographic paper covered by said mask head is longer in the case of a print provided with a margin than that in the case of a margin-less print, whereby the length of the photographic paper to be cut off is shortened so as to use said photographic paper effectively.

2. A device for conveying a photographic paper according to claim 1, wherein said control means makes said front end portion of said photographic paper, which has been covered by said mask heads, and which has been not exposed, cut with said cutter in the case of a margin-less print.

3. A device for conveying a photographic paper according to claim 1, wherein said control means makes both the front end portion of said photographic paper which has been covered with said mask heads, and which has not been exposed and a portion continued from the former of a slight length on which said image is exposed, cut with said cutter.

4. A device for conveying a photographic paper according to claim 3, wherein a unnecessary portion of said photographic paper which has been exposed in the upstream direction of an image on said photographic paper is cut with said cutter after next printing has been completed.

5. A device for conveying a photographic paper according to claim 1, wherein control of said relative positional relationship between said photographic paper and said mask heads in said printing portion is conducted in such a manner that the positions at which said mask heads are stopped are not changed between the case where a margin-less print is obtained and the case where a print provided with a margin is obtained, while the position at which said front end of said photographic paper is stopped is changed.

6. A device for conveying a photographic paper according to claim 1, wherein when said photographic paper is stopped at said cutter, said conveying means conveys said photographic paper which has been cut and exposed to the ensuing process, and stops a continuous photographic paper in such a manner that the front end of said photographic paper is stopped at said cutter until an image is next exposed, and returns said front end to said printing portion when an image is next exposed.

7. A device for conveying a photographic paper according to claim 1, wherein said conveying means is constituted in such a manner that it gives a first moving force between said accommodating portion and said printing portion, and gives a second moving force between said printing portion and said cutter, and if said front end of said photographic paper deviates from the portion in which said second moving force is given, it can move said photographic paper in the upstream direction.

8. A device for conveying a photographic paper according to claim 1, wherein when said margin-less print is obtained, the interval between a pair of said masks is made larger than the size of a print to be made a product, an image is exposed to said photographic paper through said masks, and said control means stops said photographic paper at the position of said cutter so as to cut off the surplus exposed portion with said cutter.

9. A device for conveying a photographic paper according to claim 8 further comprising a printer whereby said photographic paper is stopped and information needed is recorded on said photographic paper during conveyance of said photographic paper for the purpose of cutting an unnecessary portion at the rear end of an image on said photographic paper after an unnecessary portion at the front end of said photographic paper has been cut off after said exposure.

10. A device for conveying a photographic paper for use in a photograph printing apparatus in which a printing portion and a cutting portion are disposed away from each other, said device for conveying a photographic paper for use in a photograph printing apparatus comprising: means for conveying photographic paper which is able to return said photographic paper from said cutting portion to said portion at which said photographic paper is printed; a pair of mask heads in the lengthwise direction disposed on both sides of an optical axis for printing said photographic paper, and which determine the region to be printed by way of moving forward or rearward in the direction of the photographic paper to be conveyed with respect to said optical axis, and which form a space from a frame for loading said photographic paper for conveying said photographic paper; and control means for controlling said means for conveying said photographic paper and said mask heads in the lengthwise direction in such a manner that the front end portion of said photographic paper is covered with a mask head in the lengthwise direction on the downstream side both in the cases where a print provided with a margin is obtained and a margin-less print is obtained.

11. A device for conveying a photographic paper for use in a photograph printing apparatus according to claim 10, wherein the length of said margin-less image between said mask heads at the time of exposure is arranged slightly longer than that of a print to be made a product, and said surplus length of the printed portion is cut off after exposure.

12. A device for conveying a photographic paper for use in a photograph printing apparatus according to claim 10, wherein control of said relative positional relationship between said photographic paper and said mask heads in said printing portion is conducted in such a manner that the positions at which said mask heads are stopped are not changed between the case where a margin-less print is obtained and the case where a print provided with a margin is obtained, while the position at which said front end of said photographic paper is stopped is changed.

13. A device for conveying a photographic paper for use in a photograph printing apparatus according to claim 10, wherein when said photographic paper is stopped at said cutter, said conveying means conveys said photographic paper which has been cut and exposed to the ensuing process, and stops a continuous photographic paper in such a manner that the front end of said photographic paper is stopped at said cutter until an image is next exposed, and returns said front end to said printing portion when an image is next exposed.

14. A device for conveying a photographic paper for use in a photograph printing apparatus according to claim 10, wherein said conveying means is constituted in such a manner that it gives a first moving force between said accommodating portion and said printing portion, and gives a second moving force between said printing portion and said cutter, and if said front end of said photographic paper deviates from the portion in which said second moving force is given, it can move said photographic paper in the upstream direction.

15. A device for conveying a photographic paper for use in a photograph printing apparatus according to claim 10 further comprising a printer whereby said rear end of said image on said photographic paper which has been exposed is temporarily stopped before it is stopped at said cutter so as to be cut, and needed information is recorded on the rear side of said photographic paper.

16. A conveying device for selectively printing a marginless print in which an image is printed over the entire surface thereof and a print provided with a margin in the periphery portion thereof on a photographic paper, comprising:
  (a) an accommodating portion for accommodating an elongated photographic paper in the form of a roll;
  (b) a printing portion for printing an image on the front end portion of said photographic paper which has be drawn from said accommodating portion, said printing portion being provided with a pair of mask heads which come closer each other and moved away from each other so as to determine the size of the image to be printed on said photographic paper;
  (c) a first driving portion for drawing said photographic paper from said accommodating portion to said printing portion, and is able to, in a reversed manner, return said photographic paper from said printing portion;
  (d) a cutter disposed on the downstream side of said printing portion, and which cuts said front end portion and rear end portion of said photographic paper;
  (e) a second driving portion disposed between said printing portion and said cutter, and is able to move the intermediate portion of said photographic paper in the downstream direction and upstream direction; and
  (f) control means for determining the distance between said first and second driving means and said mask heads confronting each other, said control means changing the distance of said photographic paper to be driven in such a manner that the front end portion of said photographic paper is covered by a mask head on the downstream side at the time of printing regardless of the type of the print being a print provided with a margin or a margin-less print, and in the case of a margin-less print, the photographic paper is covered more than that in the case of a print provided with a margin.

17. A device for conveying a photographic paper according to claim 16, wherein said control means controls said mask heads in such a manner that the interval between a pair of said mask heads are made longer than the size of an image on said photographic paper to be made a product in the case of a margin-less print.

18. A device for conveying a photographic paper according to claim 16, wherein said control means makes both the front end portion of said photographic paper which has been covered with said mask heads, and which has not been exposed and a portion continued from the former of a slight length on which said image is exposed, cut with said cutter.

19. A device for conveying a photographic paper according to claim 16, whereinwhen said photographic paper is stopped at the cutter, said conveying means conveys said photographic paper which has been cut and exposed to the ensuing process, and stops a continuous photographic paper in such a manner that the front end of said photographic paper is stopped at said cutter until an image is next exposed, and returns said front end to said printing portion when an image is next exposed.

20. A device for conveying a photographic paper according to claim 16 further comprises: a printer whereby said photographic paper is stopped and information needed is recorded on said photographic paper during conveyance of said photographic paper for the purpose of cutting unnecessary portion at the rear end of an image on said photographic paper after unnecessary portion at the front end of said photographic paper has been cut off after said exposure.

* * * * *